United States Patent [19]

Fujino et al.

[11] Patent Number: 4,584,580

[45] Date of Patent: Apr. 22, 1986

[54] APPARATUS FOR REJECTING JAMMING WAVES

[75] Inventors: Teruhisa Fujino, Kawasaki; Kenichi Chiwaki, Chiba; Sadatoshi Narazaki, Yachiyo, all of Japan

[73] Assignee: Kabushiki Kaisha Koden Seisakusho, Tokyo, Japan

[21] Appl. No.: 477,548

[22] Filed: Mar. 21, 1983

[30] Foreign Application Priority Data

Mar. 29, 1982 [JP] Japan .................................. 57-50649
Mar. 29, 1982 [JP] Japan .................................. 57-50650

[51] Int. Cl.$^4$ ................................................ G01S 7/36
[52] U.S. Cl. .................................. 343/18 E; 343/389; 455/306; 328/167
[58] Field of Search ............. 343/18 E, 389; 455/306; 328/167

[56] References Cited

U.S. PATENT DOCUMENTS

| | | | |
|---|---|---|---|
| 3,769,591 | 10/1973 | Brown et al. | 343/18 E X |
| 4,135,159 | 1/1979 | Kubanoff | 343/18 E X |
| 4,135,189 | 1/1979 | Josse | 343/7.5 X |
| 4,190,837 | 2/1980 | Salvaudon et al. | 343/18 E X |
| 4,215,344 | 7/1980 | Phillips, Jr. | 343/18 E |
| 4,336,541 | 6/1982 | Tsui et al. | 343/18 E |
| 4,388,723 | 6/1983 | Keen | 343/18 E X |
| 4,395,779 | 7/1983 | Fujino et al. | 455/306 |
| 4,412,219 | 10/1983 | Briggs | 343/6.8 R |

Primary Examiner—Thomas H. Tarcza
Assistant Examiner—John B. Sotomayor
Attorney, Agent, or Firm—Pollock, Vande Sande and Priddy

[57] ABSTRACT

A variable-narrow-band rejection filter is inserted in a reception signal path for rejecting a jamming wave. Signals at input and output terminals of the narrow-band rejection filter are picked up by a pair of first and second bandpass filters each having a center frequency that can be passed thereby which is equal to a rejection frequency of the narrow-band rejection filter. A phase difference between outputs from the bandpass filter is detected by a phase comparator, and the detected signal is supplied through a switch to a hold circuit in which the supplied signal is held. The rejection frequency of the narrow-band rejection filter is adjusted into conformity with the jamming wave frequency by an output from the hold circuit. The levels of the output signals from the first and second bandpass filters are detected respectively by a pair of first and second level detectors, and the detected outputs are compared by a comparator. The foregoing switch is kept off as long as the level of the signal at the input terminal of the narrow-band rejection filter is smaller than the level of the signal at the output terminal thereof.

14 Claims, 26 Drawing Figures

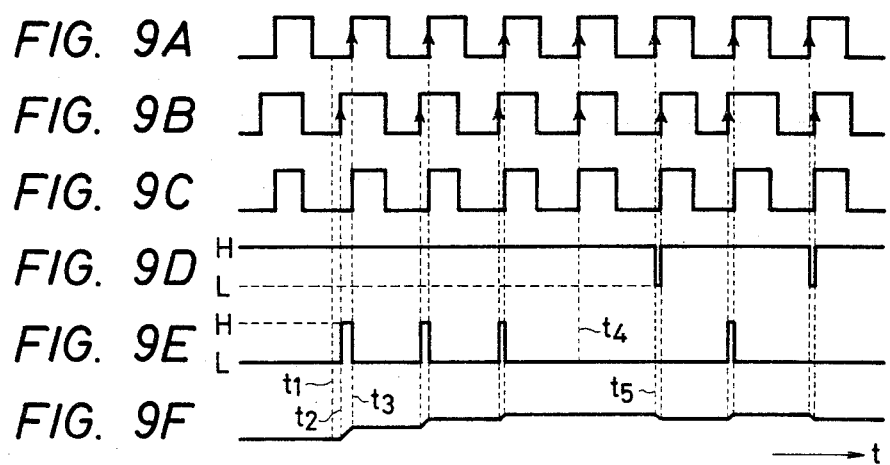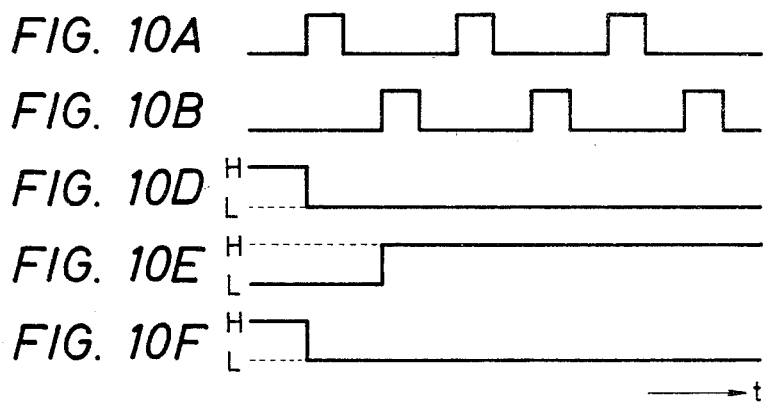

APPARATUS FOR REJECTING JAMMING WAVES

BACKGROUND OF THE INVENTION

The present invention relates to an apparatus for rejecting a jamming wave having a single frequency present in a relatively wide frequency range or in the vicinity thereof in a receiver.

Loran C receivers, for example, sometimes undergo a wave in a Decca navigational system, or so-called "Decca wave" in the vicinity of the frequency band of the Loran C receiver. When a mobile body on which a Loran C receiver is installed enters a service area covered by a Decca wave having a different frequency, it is necessary that the narrow-band rejection filter in the Loran C receiver be re-adjusted to reject the Decca wave. Since the rejection band of the narrow-band rejection filter is quite narrow, it requires increased time and skill to bring the rejection center frequency properly into conformity with the center frequency of the jamming wave. It has also been cumbersome to have to adjust the narrow-band rejection filter each time the receiver enters an area covered by a different jamming wave frequency.

It has been proposed to effect automatic adjustment of the center frequency of a narrow-band rejection filter for rejecting jamming waves into conformity with the frequency of a jamming wave. One such automatic frequency adjustment is disclosed in PCT International Publication No. W081/01930, published on July 9, 1981. When a jamming wave which is an intermittent signal is temporarily turned off, a control output from a control circuit for detecting the difference between the central frequency of the narrow-band rejection filter and the jamming wave frequency is widely deviated from a normal condition. In case the rejection center frequency of the narrow-band rejection filter is controlled by such an erroneous detected output, the jamming wave cannot temporarily be rejected each time the jamming wave is turned off, and the control circuit has to be controlled again to adjust the center frequency of the narrow-band rejection filter so as to coincide with the frequency of the jamming wave. Even fully automatic control needs a period of time for bringing the center frequency into conformity with the jamming wave frequency. Another control mode is known in which the rejection frequency is manually adjusted into substantial conformity with the jamming wave frequency, and then the rejection frequency is automatically brought accurately into conformity with the jamming wave frequency. With such an adjustment process, the operator is required to effect manual control each time the jamming wave is turned off.

The narrow-band rejection filter has generally been comprised of a notch filter. Where the range in which the rejection frequency of the narrow-band rejection filter is variable is relatively wide, frequencies at both ends of the variable-frequency range cannot sufficiently be cut off or attenuated. This difficulty has been found due to the fact that the effective resistance of an inductance coil employed in the notch coil becomes increased as the rejection frequency goes higher, and signals passing through a resistor and a capacitor connected in series with input and output terminals of the notch filter have a large level difference therebetween. A variable resistor shunted across the input and output terminals of the notch filter on the side of the capacitor can be adjusted each time the rejection frequency is altered, thus reaching a sufficient degree of attenuation in any rejection frequency. However, such adjustment of the variable resistor is troublesome.

SUMMARY OF THE INVENTION

It is an object of the present invention to provide an apparatus for rejecting jamming waves which is capable of keeping the rejection center frequency of a narrow-band rejection filter in a condition immediately before a jamming wave being rejected thereby is temporarily turned off, without being adversely affected by such temporary wave turn-off.

Another object of the present invention is to provide an apparatus for rejecting jamming waves which can vary the rejection frequency in a wide range, can sufficiently suppress a jamming wave, and needs no troublesome frequency adjustment.

Still another object of the present invention is to provide an apparatus for rejecting jamming waves which is capable of detecting the difference between the rejection frequency of a narrow-band rejection filter and the frequency of a jamming wave with a relatively simple construction.

According to the present invention, a narrow-band rejection filter is inserted in a reception signal path, and signals at input and output terminals of the narrow-band rejection filter are picked up and supplied to a control circuit, which detects the difference between a rejection frequency of the narrow-band rejection filter and the frequency of a jamming wave. An output from the control circuit is held by a hold circuit, which produces an output for setting the rejection frequency of the narrow-band rejection filter. Thus, the rejection frequency of the narrow-band rejection filter is automatically brought into conformity with the frequency of the jamming wave to be rejected. The signals at the input and output terminals of the narrow-band rejection filter are supplied to a pair of first and second level detectors, and amplified and rectified thereby, respectively, so that the levels of the signals at the input and output terminals of the narrow-band rejection filter can be detected. When the rejection frequency of the narrow-band rejection filter is in conformity with the frequency of the jamming wave to be rejected, the level of the signal at the input terminal of the narrow-band rejection filter is large, and the level of the signal at the output terminal thereof is extremely small, as long as the jamming wave is received. When the jamming wave is temporarily interrupted while the rejection frequency of the narrow-band rejection filter is in conformity with the frequency of the jamming wave, the difference between the signal levels at the input and output terminals of the narrow-band rejection filter is small during the interruption of the jamming wave. Therefore, the interruption of the jamming wave can be detected by comparing in a comparator the levels detected by the first and second level detectors. While the jamming wave is interrupted, no detected output is supplied from the control circuit to the hold circuit. More specifically, a switch is inserted in a path for supplying the detected output from the control circuit to the hold circuit, and the switch is turned off by an output from the comparator when noise is applied to the narrow-band rejection filter or a jamming wave is interrupted, so that no detected output can be delivered from the control circuit to the hold circuit. The first and second level detectors are constructed such that when the inputs to the first and second level detectors are considerably low at the same time, the output from the first level detector is smaller in level than the output from the second level detector. Under this condition, the comparator produces an output which prevents the detected output of the control circuit from being supplied to the hold circuit.

The narrow-band rejection filter has an inductive element disposed in a capacitor path and a compensation capacitor inserted in series with the inductive element. The compensation capacitor has an impedance small enough to have no effect on the rejection frequency and has impedance-frequency characteristics which vary in inverse proportion to effective-resistance-frequency characteristics of the inductive element. The sum of the impedance of the compensation capacitor and the effective resistance of the inductive element is kept substantially constant in the range in which the rejection frequency is variable.

In the control circuit, the signals at the input and output terminals of the narrow-band rejection filter are picked up by first and second bandpass filters each having a central frequency that can be passed thereby which is substantially equal to the rejection frequency of the narrow-band rejection filter. The phase difference between the picked-up signals is detected by a phase comparator. The phase comparator is constructed of an AND gate for ANDing square-wave outputs supplied via waveform shapers from the first and second bandpass filters, a pair of flip-flops cleared by an output from the AND gate and triggered by the square-wave outputs, the flip-flops having input terminals kept in one of the logic levels at least under an initial condition, a pair of first and second series-connected circuits each composed of a resistor and a diode and having one ends connected to unlike output terminals of the first and second flip-flops and the other ends connected to each other at a junction, the diodes having opposite polarities seen from the junction, and a capacitor connected between the junction and ground. The capacitor is charged and discharged dependent on the outputs from the first and second flip-flops with a time constant determined by the capacitor itself and the above resistors. The voltage across the capacitor is supplied to the narrow-band rejection filter as a control voltage for controlling the rejection center frequency of the narrow-band rejection filter. The flip-flops, the AND gate, the diodes, the resistors, and the capacitor, which are of ordinary construction, jointly constitute the phase comparator. The voltage across the capacitor is maintained correctly when the outputs from the flip-flops are both zero.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 9A through 9F are timing charts showing operations of the phase comparator shown in FIG. 8;

FIGS. 10A, 10B, 10D through 10F are timing charts illustrative of operations of the phase comparator of FIG. 8 under special conditions;

DESCRIPTION OF THE PREFERRED EMBODIMENTS

Figure 1:
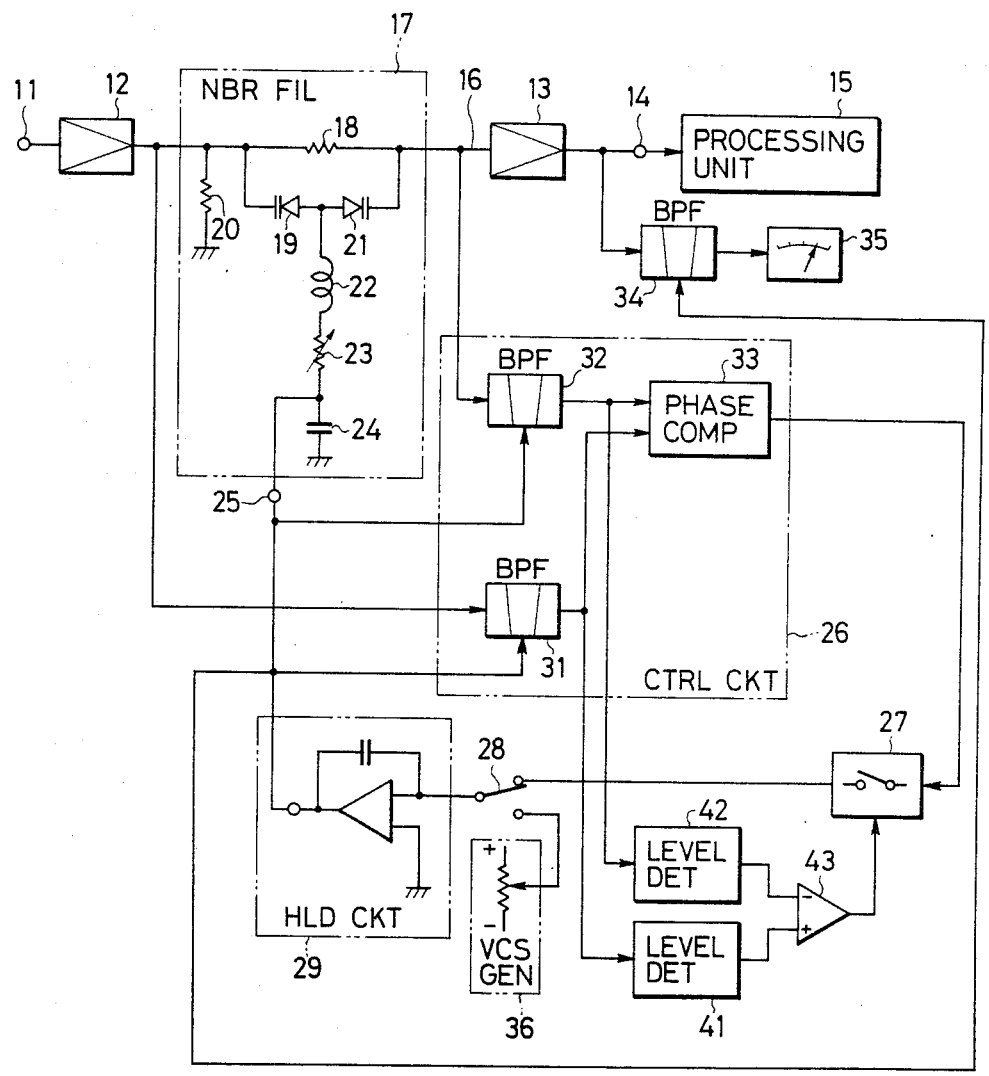
FIG. 1 is a block diagram of an apparatus for rejecting jamming waves according to the present invention.

FIG. 1 shows an apparatus for rejecting jamming waves. A received signal is fed from an input terminal 11 through a pre-amplifier 12, a post-amplifier 13, and a reception output terminal 14 to a processing unit 15 such for example as a received Loran C signal processing unit. A Loran C receiver is disclosed in U.S. Pat. No. 3,868,691, issued on Feb. 25, 1975, for example. A narrow-band rejection filter 17 is inserted in series in a received signal path 16 between the input and output terminals 11, 14. In the illustrated embodiment, the narrow-band rejection filter 17 is connected between the pre-amplifier 12 and the post-amplifier 13. The narrow-band rejection filter 17 has a rejection center frequency which is variable by a control signal, and includes, for example, a resistor 18 connected in series between the pre- and post-ampclifiers 12, 13, a pair of variable capacitance diodes 19, 21 connected across the resistor 18 in series with each other in opposite polarities, and a series-connected circuit composed of an inductive element 22, a resistor 23, and a DC blocking capacitor 24 and connected between the junction between the variable capacitance diodes 19, 21 and the ground. The junction between the resistor 23 and the capacitor 24 is coupled to a control signal input terminal 25 to which a DC voltage is applied to vary the rejection center frequency of the narrow-band rejection filter 17. Either one of the input and output terminals of the filter 17, the input terminal in the illustrated embodiment, is grounded through a resistor 20 such that a voltage dependent correctly on the control signal voltage applied to the terminal 25 can be imposed on the variable capacitance diodes 19, 21. Signals at the input and output terminals of the narrow-band rejection filter 17 are branched and supplied to a control circuit 26. The control circuit 26 serves to detect the difference between the rejection center frequency of the narrow-band rejection filter 17 and the frequency of a jamming wave to be rejected. The detected difference or output from the control circuit 26 is fed via switches 27, 28 to a hold circuit 29. The signal that is held by the hold circuit 29 is delivered as a signal for controlling the rejection center frequency to the narrow-band rejection filter 17 through the terminal 25.

The control circuit 26 includes a pair of bandpass filters 31, 32 receptive of the signals picked up from the input and output terminals of the narrow-band rejection filter 17. The bandpass filters 31, 32 are of the same characteristics, and have a center frequency that can be passed which is substantially the same as the rejection center frequency of the narrow-band rejection filter 17. Signals that have passed through the bandpass filters 31, 32 are compared with each other in phase by a phase comparator 33. A bandpass filter 34 is connected to a stage following the narrow-band rejection filter 17, that is, an output terminal of the post-amplifier 13 in the illustrated example. The bandpass filter 34 produces an output fed to an indicator 35 which indicates the intensity of the supplied signal.

The bandpass filter 34 has a center frequency which can be controlled by a control signal, and may be composed partly of a variable capacitance diode. The bandpass filter 34 and the narrow-band rejection filter 17 have control characteristics selected so that they will be controlled by the same control signal to have the same center frequency.

The switch 28 has a movable contact connected to an input terminal of the hold circuit 29, which has an output terminal coupled to frequency-control terminals of the bandpass filters 31, 32, 34 as well as to the control terminal 25 of the narrow-band rejection filter 17. Thus, the filters 17, 31, 32, 34 are supplied with control signals from the hold circuit 29, the input side of which is selectively connected by the switch 28 to the control signal generator 36 and the output side of the phase comparator 33. The filters 17, 31, 32 have the same center-frequency control signal characteristics selected such that the filters 17, 31, 32 will have the same center frequency under the control of the same control signal.

Figure 2:
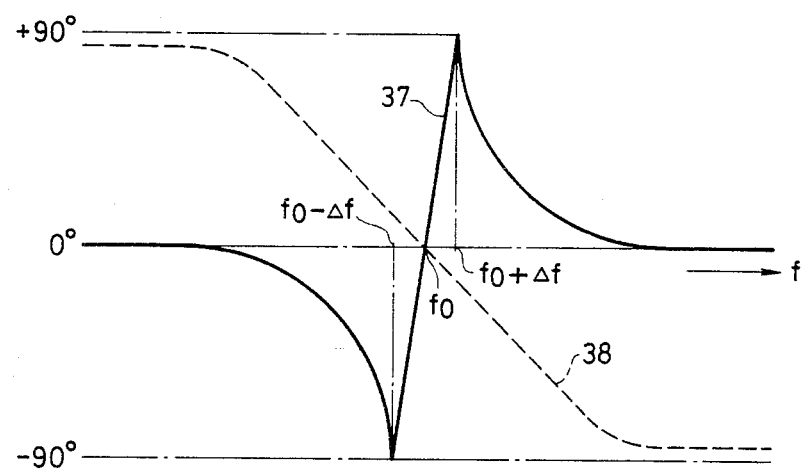
FIG. 2 is a graph showing the phase-frequency characteristics of filters in the apparatus shown in FIG. 1.

The narrow-band rejection filter 17 has phase-frequency characteristics shown by a curve 37 in FIG. 2. Frequencies slightly lower than a rejection center frequency fo are delayed in phase by 90°, and those slightly higher than the rejection center frequency fo lead in phase by 90°. Accordingly, the phase changes sharply across the center frequency fo, and the phase variation gradually decreases to 0 as the frequency goes out of the range of from $fo - \Delta f$ to $fo + \Delta f$ in which the phase varies sharply. Thus the filter 17 is of the phase-cancel type. The bandpass filters 31, 32, 34 are composed of a single-peak tuned circuit comprising a capacitor and a coil, and have phase-frequency characteristics as shown by a curve 38 in FIG. 2. The bandpass filters 31, 32, 34 have a center frequency fo that can be passed. Those frequencies which are lower than the center frequency fo are of leading phase, and those higher than the center frequency fo are of lagged phase. The phase gradually changes as the frequency departs away from the center frequency fo.

In FIG. 1, while the movable contact of the switch 28 is connected to the control signal generator 36, the output of the control signal generator 36 is adjusted to provide a maximum indication of the indicator 35, that is, to bring the center frequency of the bandpass filter 34 into substantial conformity with the frequency of a jamming wave to be rejected, by which the center frequency of the narrow band rejection filter 17 is brought into substantial but not exact conformity with the jamming wave frequency. This adjustment can easily be effected as the pass band width of the bandpass filter 34 is considerably wider than the rejection band width of the narrow-band rejection filter 17. The filters 17, 34 are thus controlled to cause the center frequency of the jamming wave to fall in the substantially linear range of $fo \pm \Delta f$ in the phase-frequency characteristics of the narrow-band rejection filter 17 as illustrated in FIG. 2. In this condition, the phases of the outputs of the filters 31, 32 are substantially determined by the curve 37 in FIG. 2. Therefore, the difference between the phases of the outputs from the filters 31, 32 can be detected by the phase comparator 33, thereby detecting the difference between the rejection center frequency fo of the narrow-band rejection filter 17 and the frequency of the jamming wave. More specifically, when the jamming frequency is higher than the rejection center frequency fo, the output of the filter 32 has a leading phase with respect to the output of the filter 31. When the jamming frequency is lower than the rejection center frequency fo, the output of the filter 31 has a leading phase with respect to the output from the filter 32. Thus, by connecting the switch 28 to the side of the control circuit 26, the phase difference signal is supplied to the filter 17 via the hold circuit 29 to automatically lock the center frequency of the narrow band rejection filter 17 into the jamming wave frequency.

The signals from the input and output terminals of the narrow-band rejection filter 17 are subjected to level detection. In the illustrated embodiment, the outputs from the bandpass filters 31, 32 are supplied to level detectors 41, 42, respectively, which produce outputs that are compared in magnitude with each other by a comparator 43. An output from the comparator 43 is used to control the switch 27.

When the rejection center frequency fo of the narrow-band rejection filter 17 is in agreement with the jamming frequency, the output from the narrow-band rejection filter 17 becomes sufficiently smaller than the input thereof. Therefore, the output from the level detector 42 becomes smaller while the output from the level detector 41 is kept large. The output of the comparator 43 then goes high to turn on the switch 27, which allows the output from the control circuit 26 to be applied to the hold circuit 29. In the event of interruption of the jamming wave, the narrow-band rejection filter 17 is brought into a condition as if it were supplied with noise. The signals at the input and output terminals of the filter 17 are kept substantially the same level. The output levels of the level detectors 41, 42 are substantially equalized with each other. Under this condition, the detection level of the level detector 41 connected to the input terminal of the filter 17 is rendered smaller than the detection level of the level detector 42 coupled to the output terminal of the filter 17. As a result, the switch 27 is turned off, and no output from the control circuit 26 is supplied to the hold circuit 29. The output control signal from the control circuit 26, which is not reliable during interruption of the jamming wave, is not delivered to the hold circuit 29. Since the hold circuit 29 keeps the control signal previously supplied, it enables the narrow-band rejection filter 17 to reject any jamming wave which will be entered again.

Figure 3:
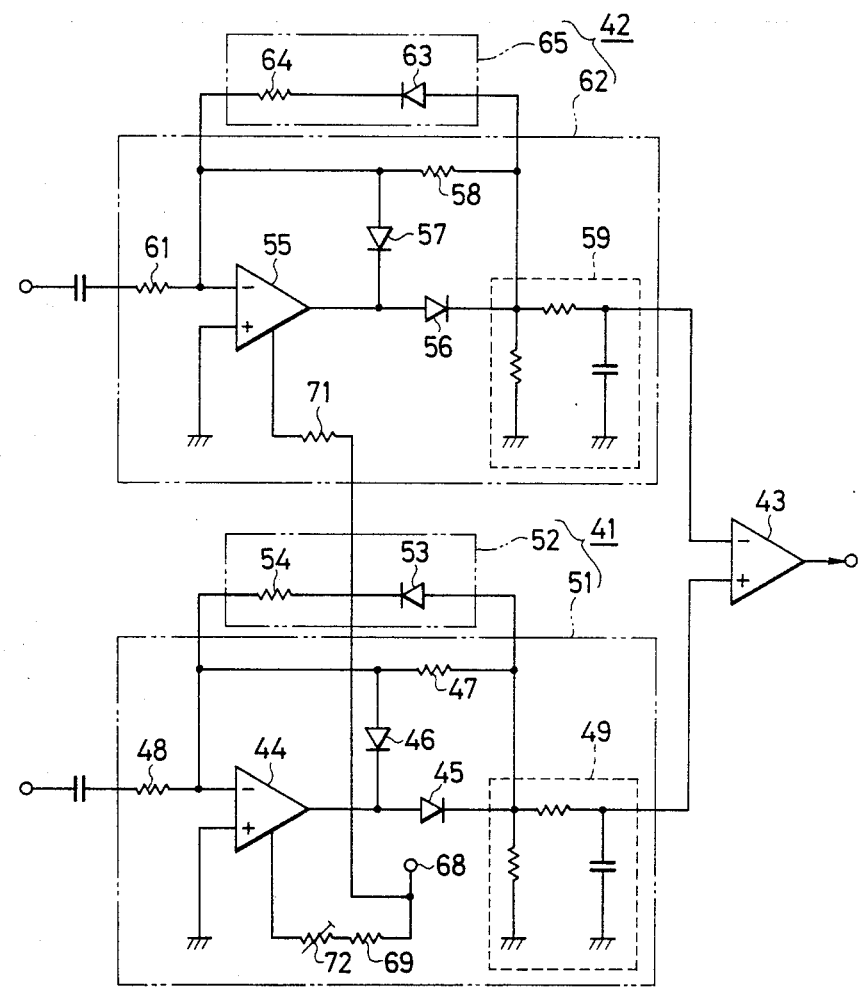
FIG. 3 is a circuit diagram of level detectors in the apparatus of FIG. 1.

The level detectors 41, 42 are constructed as shown in FIG. 3, for example. The level detectors 41, 42 serve to amplify and rectify input signals applied thereto. The level detector 41 has an operational amplifier 44, a pair of diodes 45, 46 connected in opposite polarities and having terminals coupled to an output terminal of the operational amplifier 44, and a resistor 37 connected to the other terminals of the diodes 45, 46. The junction between the resistor 47 and the diode 46 is connected to an inverted-input terminal of the operational amplifier 44. Thus the resistor 47 serves as a feedback resistor for the operational amplifier 44. An input resistor 48 is connected to the inverted-input terminal of the operational amplifier 44, while the noninverted-input terminal of the operational amplifier 44 is connected to ground. A smoothing circuit 49 for smoothing a rectified output from the diode 45 is connected to the junction between the diode 45 and the resistor 47. The operational amplifier 44, the diodes 45, 46, the feedback resistor 47, the input resistor 48, and the smoothing circuit 49 jointly constitute an amplifier and rectifier circuit 51, to which a gain suppressing circuit 52 is coupled. The gain suppressing circuit 52 is composed of a diode 53 and a resistor 54 connected in series therewith, which are coupled across the feedback resistor 47.

When the input to the level detector 41 is positive, the output of the operational amplifier 44 becomes negative rendering the diode 45 nonconductive, and no output is produced. When the input to the level detector 41 is negative, the operational amplifier 44 produces a positive output which renders the diode 45 conductive that supplies its output to the smoothing circuit 49 through half-way rectification. As the negative input to the level detector 41 becomes larger in the negative direction, the output level of the operational amplifier 44 becomes higher, and so does the input level of the smoothing circuit 49, whereupon the diode 53 in the gain suppressing circuit 52 is rendered conductive. Until the diode 53 is energized, the gain of the amplifier and rectifier circuit 51 is determined by the input resistor 48 and the feedback resistor 47. When the diode 53 is rendered conductive, however, the gain is governed by the input resistor 48 and the parallel-connected resistors 47, 54, and as a result the gain is lowered. Accordingly, the gain is suppressed with respect to a larger input.

Like the level detector 41, the level detector 42 is composed of an amplifier and rectifier circuit 62 comprising an operational amplifier 55, a pair of diodes 56, 57, a feedback resistor 58, a smoothing circuit 59, and a gain suppressing circuit 65 comprising a diode 63 and a resistor 64.

Figure 4A:
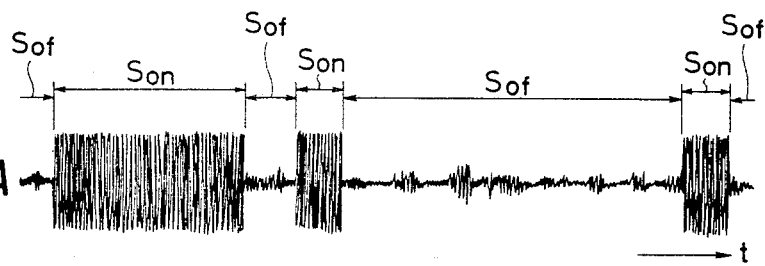
FIGS. 4A through 4D and 4C' are waveform diagrams illustrative of operation of the apparatus of FIG. 1.
Figure 4B:
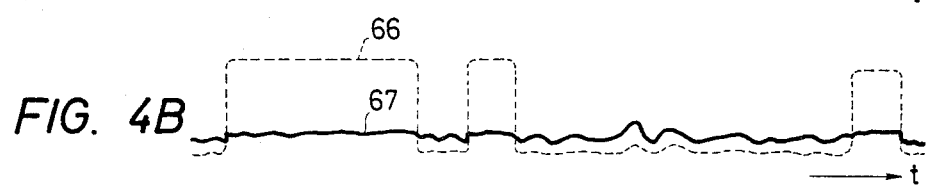
Figure 4C:

The switching point of the switch 27 in FIG. 1 is determined through selection of the resistances of the input resistors 48, 61 in the level detectors 41, 42. In the illustrated embodiment, the resistance of the input resistor 48 is selected to be greater than that of the input resistor 61. The resistances of the resistors 47, 58 are equalized with each other, and the resistances of the resistors 54, 64 are equalized with each other. Where the resistance of the resistor 48 is twice, for example, that of the resistor 61, the gain of the level detector 41 is half the gain of the level detector 42. In case the attenuation degree of the narrow-band rejection filter 17 is 6 dB, for example, that is, ½, the outputs of the level detectors 41, 42 are of the same level when the level of the output signal of the narrow-band rejection filter 17 is half the level of the input signal of the filter 17. The switch 27 is turned on only when the level of the input signal of the narrow-band rejection filter 17 is greater than twice the level of the output signal of the narrow-band rejection filter 17. The switch 27 is turned off when the input signal level is smaller than twice the output signal level.

Where a jamming signal which is an intermittent signal with the signal on during an interval Son and off during an interval Sof as shown in FIG. 4A is applied, the output from the level detector 41 is of a larger level during the on-signal interval Son as shown by the dotted line 66 in FIG. 4B, and of a smaller level during the off-signal interval Sof. The output from the level detector 42 remains low as shown by the solid line 67 in FIG. 4B since the signal is blocked by the narrow-band rejection filter 17 during the on-signal interval Son. During the on-signal interval Son, the detected output 66 indicative of the input signal level is higher than twice the detected output 67 of the output signal level, and the output of the comparator 43 goes high to turn on the switch 27 as shown in FIG. 4C. During the off-signal interval Sof, the detected output 66 indicative of the input signal level is lower than twice the detected output 67 of the output signal level, and the output of the comparator 43 goes low to turn off the switch 27 as shown in FIG. 4C.

Figure 4D:
Figure 4C:
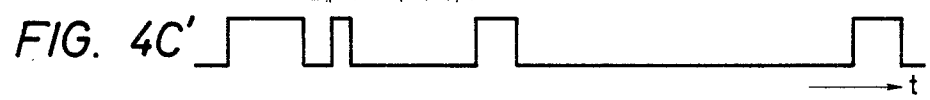

When noise N1 occurs which is sufficiently larger in level than the signal during the on-signal interval Son as shown in FIG. 4D, the signal level difference between the input and output terminals of the narrow-band rejection filter 17 becomes smaller during a period in which the noise N1 is present. The output from the comparator 43 goes low as shown in FIG. 4C' during such a noise period, thereby turning off the switch 27. Accordingly, the output from the control circuit 26 is supplied to the hold circuit 29 only when the control circuit 26 detects correctly the difference between the jamming frequency and the rejection center frequency.

In FIG. 3, a voltage for setting a minimum output level for the operational amplifiers 44, 55 is applied from a terminal 68 through resistors 69, 71, respectively. An additional resistor 72 is inserted in series between the operational amplifier 44 for the level detector 41 and the resistor 69. When the inputs to the level detectors 41, 42 are substantially zero or extremely small, the minimum output level of the operational amplifier 44 is smaller than that of the operational amplifier 55, and the detection level of the level detector 41 is smaller at all times than the detection level of the level detector 42. Under the condition in which the control circuit 26 fails to operate properly because of no input or extremely small input, the output of the comparator 43 is of the low level, and the switch 27 is turned off.

The impedance of the DC blocking capacitor 24 in the narrow-band rejection filter 17 is sufficiently smaller as compared with the impedance of each of the variable capacitance diodes 19, 21. Therefore, the DC blocking capacitor 24 has no substantial effect on the resonance frequency characteristics of a resonance circuit composed of the variable capacitance diodes 19, 21 and the inductive element 22. The DC blocking capacitor 24 has impedance-frequency characteristics as shown by a curve 73 in FIG. 5. This impedance-frequency characteristics varies substantially in inverse proportion to the effective-resistance-frequency characteristics of the inductive element 22 as shown by a curve 74 in FIG. 5. The sum of the impedance and the resistor is indicated by a line 75 which extends substantially parallel to the frequency axis. The impedance-frequency characteristics of the DC blocking capacitor 24 are generally curved, not linear, as shown by the curve 73. The curve 73 crosses an ideal line 76 therefor at two points which crosses the effective-resistance-frequency characteristic line 74 in inverse proportion relation, the two points being located at the ends $fco-\Delta fc$, $fco+\Delta fc$ of the range in which the rejection frequency is variable. It is preferable that the resistance of the resistor 23 be adjusted to maximize the amount of attenuation of the frequency at one of the crossing points at the rejection center frequency of the filter 17. The resistor 23 is a variable resistor.

Figure 5:
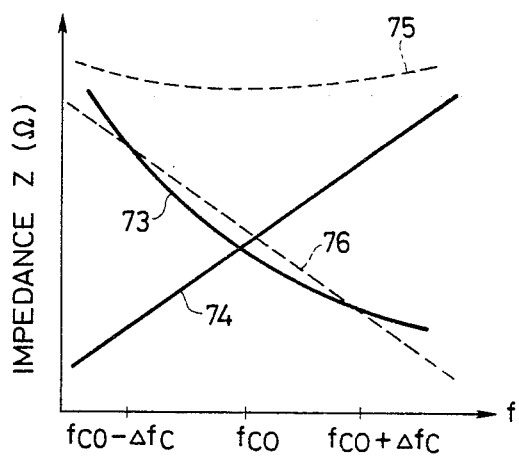
FIG. 5 is a graph showing impedance-frequency characteristics.
Figure 6:
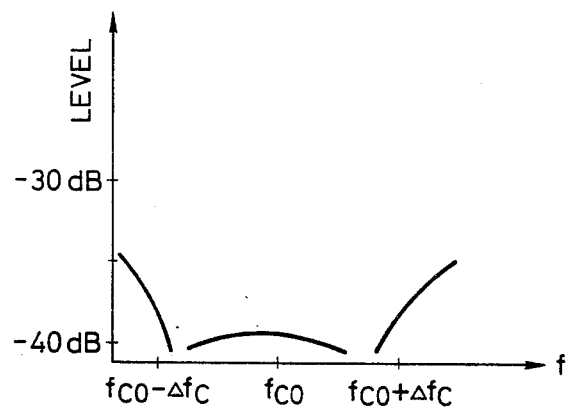
FIG. 6 is a graph illustrating attenuation characteristics of a narrow-band rejection filter at a rejection frequency thereof.
Figure 7:
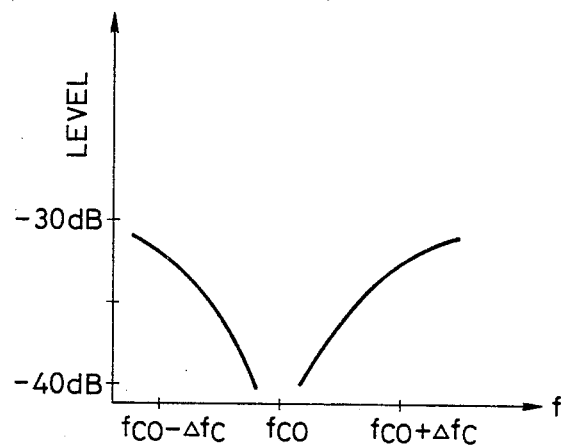
FIG. 7 is a graph illustrating attenuation characteristics of a conventional narrow-band rejection filter at a rejection frequency thereof.

With the above arrangement, the frequency components that have passed through the resonance circuit of the variable capacitance diodes 19, 21 and the inductive element 22 and the components of the same frequencies having passed through the resistor 18 are substantially the same in level in the range in which the rejection frequency of the narrow-band rejection filter 17 is variable. In this variable-frequency range of $fco-\Delta fc$ through $fco+\Delta fc$, a large amount of attenuation can be achieved for the rejection frequency as illustrated by the signal level-frequency characteristics in FIG. 6. FIG. 6 shows amounts of attenuation in terms of level at rejection center frequencies as they are varied. Where the impedance-frequency characteristics of the DC blocking capacitor 24 are not selected in the relationship as shown in FIG. 5, the attenuation-frequency characteristics corresponding to those shown in FIG. 6 are such as shown in FIG. 7 in which the amount of attenuation becomes lowered as the rejection center frequency departs from the center fco of the variable range. With the present invention, about 10 dB of attenuation can be increased in the variable-rejection-frequency range under the foregoing conditions described with reference to FIG. 5. The capacitance of the DC blocking capacitor 24 which meets such conditions should preferably range from 0.01 to 0.22 $\mu F$.

Figure 8:
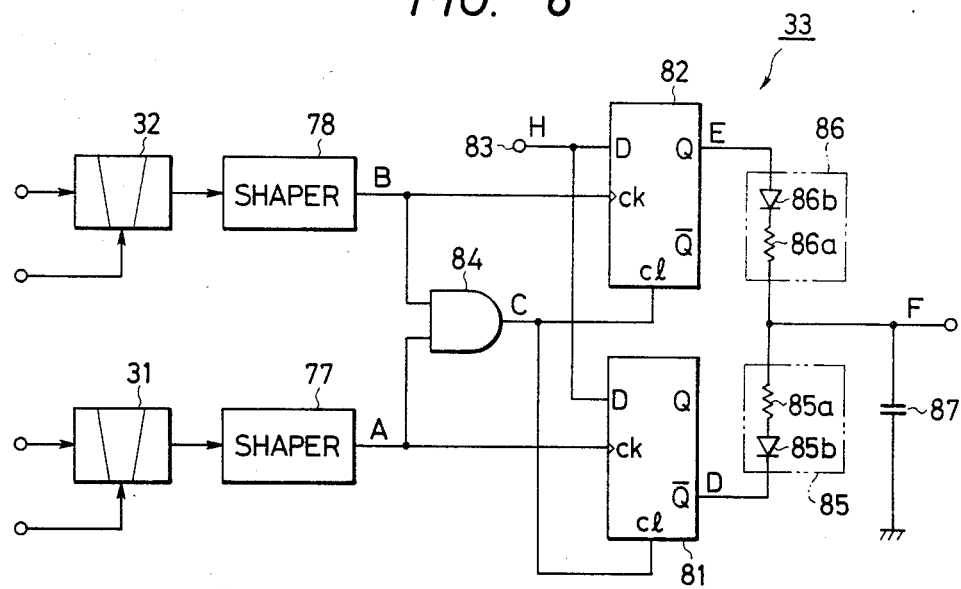
FIG. 8 is a block diagram of a phase comparator in the apparatus illustrated in FIG. 1.

The phase comparator 33 in FIG. 1 may be of the construction as shown in FIG. 8. The outputs from the bandpass filters 31, 32 are shaped into square waveforms by a pair of waveform shapers 77, 78, respectively, and the shaped signals are then supplied to a pair of flip-flops 81, 82. More specifically, the square-wave outputs from the waveform shapers 77, 78 are applied to trigger or clock terminals ck of the flip-flops 81, 82. Signals at data terminals D are read into the flip-flops 81, 82 at positive-going edges, for example, of the square-wave outputs. One of the logic levels, high level in the illustrated embodiment, is applied from a terminal 83 to the data terminal D of each of the flip-flops 81, 82. The outputs from the waveform shapers 77, 78 are also supplied to and ANDed by an AND gate 84, which produces an output to clear the flip-flops 81, 82.

A series-connected circuit 85 composed of a resistor 85a and a diode 85b has one end connected to an output terminal or $\overline{Q}$ terminal of the flip-flop 81. Another series-connected circuit 86 composed of a resistor 86a and a diode 86b has one end connected to an output terminal or Q terminal of the flip-flop 82. The other ends of the series-connected circuits 85, 86 are connected together and to one end of a capacitor 87, the other end of which is grounded. The junction between the circuits 85, 86 is also coupled as the output terminal of the control circuit 26 to the switch 27.

When the frequency fn of a jamming wave to be blocked is higher than the rejection center frequency fo of the narrow-band rejection filter 17, the output from the filter 17 has a leading phase with respect to the input to the filter 17, as described above. The waveform shapers 77, 78 produce waveforms as shown in FIGS. 9A, 9B, respectively. As long as the outputs from the waveform shapers 77, 78 are high at the same time, the output from the AND gate 84 is of the high level as shown in FIG. 9C, keeping the flip-flops 81, 82 cleared. When control starts from a time $t_1$, a positive-going edge of the leading-phase output (FIG. 9B) from the waveform shaper 27 triggers the flip-flop 82 to produce a high Q output at a time $t_2$. When the square-wave output (FIG. 9A) from the waveform shaper 77 then goes high at a time $t_3$, the output from the AND gate 84 goes high as illustrated in FIG. 9C, clearing the flip-flops 81, 82. During the interval between the times $t_2$, $t_3$, the Q output from the flip-flop 82 is kept at the high level as shown in FIG. 9E, thereby rendering the diode 86b conductive to charge the capacitor 87. The charging time constant is determined by the resistor 86a and the capacitor 87. The voltage across the capacitor 87 is increased gradually as shown in FIG. 9F.

As the voltage across the capacitor 87 increases, the rejection center frequency of the narrow-band rejection filter 17 becomes higher. As the interval in which the diode 86b is rendered conductive is gradually shortened under this control, the rejection center frequency fo of the narrow-band rejection filter 17 approaches the frequency fn of the jamming wave until they are in conformity with each other, whereupon the output waveforms from the waveform shapers 77, 78 are in phase with each other at a time $t_4$. At this time, the capacitor 87 is neither charged nor discharged.

When the rejection center frequency of the filter 17 is increased higher than the jamming frequency, the output from the waveform shaper 77 has a leading phase with respect to the output from the waveform shaper 78 as shown at a time $t_5$ in FIGS. 9A and 9B. At this time, the flip-flop 81 is triggered first to cause its $\overline{Q}$ output to go low as shown in FIG. 9D. During the interval in which the $\overline{Q}$ output of the flip-flop 81 is of the low level, the diode 85b is rendered conductive, and the capacitor 87 is discharged to allow the voltage thereacross to be lowered as shown in FIG. 9F. The rejection center frequency of the narrow-band rejection filter 17 is then lowered gradually until it is brought into conformity with the jamming frequency fn.

As described above, the phase difference between the signals at the input and output terminals of the narrow-band rejection filter 17 is detected by the phase comparator 33, and the detection output from the phase comparator 33 is used to automatically bring the rejection center frequency of the narrow-band rejection filter 17 into conformity with the frequency of the jamming wave. Therefore, adjustment of the rejection center frequency fo can be achieved simply without relying on manual time-consuming operation which would require much skill on the part of the operator. The flip-flops 81, 82 and the AND gate 84 in the phase comparator 33 may be composed of off-the-shelf components. When the rejection center frequency fo of the narrow-band rejection filter 17 agrees with the jamming frequency fn, the outputs from the flip-flops 81, 82 remain high and low, respectively, and the diodes 85b, 86b are kept nonconductive to maintain the capacitor 87 charged. As a consequence, the control voltage applied to the narrow-band rejection filter 17 is kept at a constant level. The voltage across the capacitor 87 may be supplied through an amplifier, an inverter or a level shifter as necessary to the hold circuit 29.

When the outputs from the waveform shapers 77, 78 are forced into a condition in which there is no interval in which they are overlapped or coexist at the same time because of an extremely large input signal applied, the output from the AND gate 84 remains low, and the flip-flops 81, 82 are not cleared. By triggering, the $\overline{Q}$ output of the flip-flop 81 remains low as shown in FIG. 10D and the Q output of the flip-flop 82 remains high as illustrated in FIG. 10E. Therefore, the voltage across the capacitor 87 is maintained midway between the high and low levels, and the rejection center frequency fo of the narrow-band rejection filter 17 is located at the center of the control range. Under this condition, there is a danger for the center frequency of a Loran C receiver to coincide with the center frequency of the narrow-band rejection filter 17, with the result that any signal frequency to be obtained is affected by the narrow-band rejection filter 17.

Figure 11:
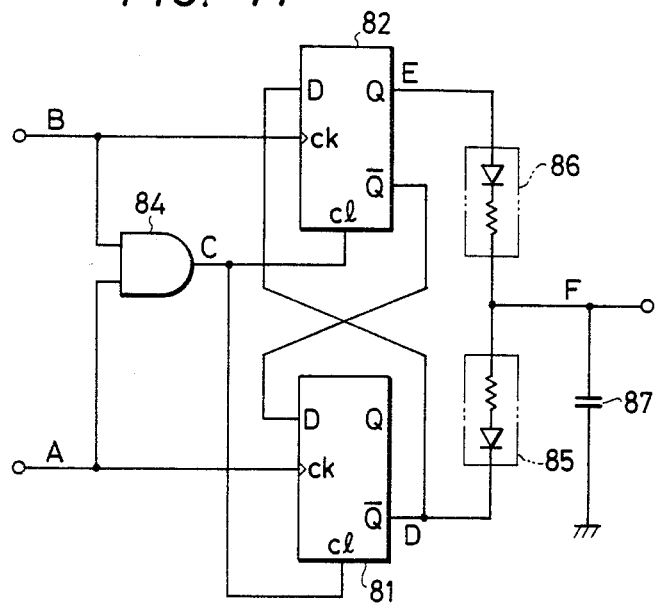
FIG. 11 is a block diagram of a phase comparator according to another embodiment.

Such a difficulty can be avoided by an arrangement shown in FIG. 11. Like or corresponding parts shown in FIG. 11 are denoted by like or corresponding reference characters in FIG. 8. The $\overline{Q}$ output terminal of the flip-flop 81 is connected to the data terminal D of the flip-flop 82, and the $\overline{Q}$ output terminal of the flip-flop 82 is connected to the data terminal D of the flip-flop 81, the terminals being thus interconnected in a crossed wiring formation. When one of the flip-flops 81, 82, the flip-flop 81 for example, is triggered first, its $\overline{Q}$ output goes high. Since the $\overline{Q}$ output is applied to the data terminal D of the flip-flop 82, the Q output of the flip-flop 82 goes high when the latter is triggered thereafter. Thus the flip-flops 81, 82 are brought into the low or high levels simultaneously. The voltage across the capacitor 87 is kept at either the low level or the high level, and the rejection center frequency of the narrow-band filter 17 is controlled so as to be at the lower or higher end of the control range therefor. As a consequence, a desired reception signal will not be affected by the narrow-band rejection filter 17.

Figure 12:
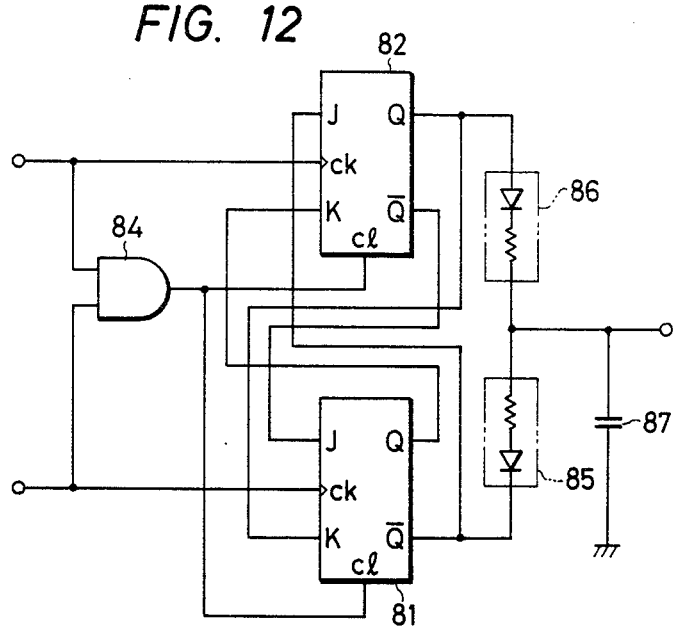
FIG. 12 is a block diagram of a phase comparator according to still another embodiment.

While in the above embodiment D-type flip-flops are employed for the flip-flops 81, 82, JK flip-flops may be used as illustrated in FIG. 12. Like or corresponding parts shown in FIG. 12 are indicated by like or corresponding reference characters in FIGS. 8 and 11, and will not be described in detail.

Figure 13:
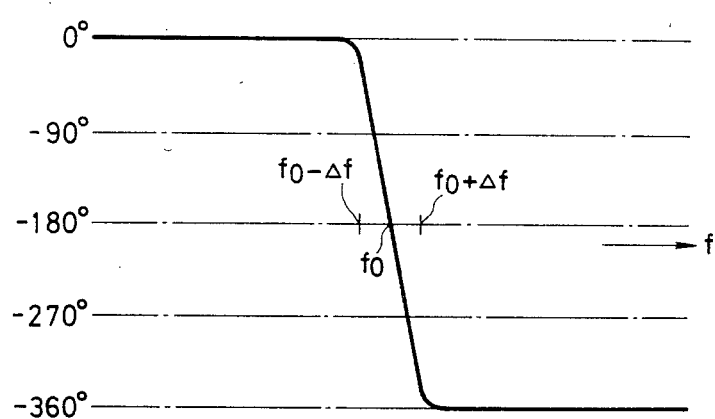
FIG. 13 is a graph showing phase-frequency characteristics of a narrow-band rejection filter according to another embodiment.

The narrow-band rejection filter 17 may be of characteristics such that, as shown in FIG. 13, the phase difference between the input and the output thereto is 180° at the rejection center frequency fo, 0° at frequencies lower than the rejection center frequency fo, and 360° at frequencies higher than the rejection center frequency fo. While in the foregoing the single narrow-band rejection filter 17 is connected between the input and output terminals 11, 14, a plurality of such narrow-band rejection filters may be connected with their rejection center frequencies in conformity with difference jamming frequencies. In such an arrangement, the control circuit 26 is shared for supplying a control voltage through the hold circuit to each of the narrow-band rejection filters employed. The rejection center frequency of the narrow-band rejection filter 17 can automatically be controlled without manual control at all. Accordingly, the present invention is applicable to the apparatus shown in FIG. 5 of the PCT International Publication No. W081/01930.

Although certain preferred embodiment have been shown and described, it should be understood that many changes and modifications may be made therein without departing from the scope of the appended claims.

What is claimed is:

1. An apparatus for rejecting a jamming wave, comprising:
   (a) a narrow-band rejection filter inserted in series in a reception signal path and having a rejection center frequency variable by a control signal;
   (b) control means connected to input and output termianls of said narrow-band rejection filter for detecting any difference between said rejection center frequency of said narrow-band rejection filter and the frequency of the jamming wave to be rejected based on signals from said input and output terminals;
   (c) first and second level detectors for amplifying and rectifying said signals from said input and output terminals respectively and for detecting the levels of said signals;
   (d) a level comparator connected to output terminals of said first and second level detectors for receiving the detected levels therefrom; receiving the detected levels therefrom;
   (e) hold means for receiving and holding a signal indicative of the frequency difference detected by said control means and for supplying the signal held therein to said narrow-band rejection filter as said control signal;
   (f) a switch inserted between an input terminal of said hole means and an output terminal of said control means and controllable by an output from said level comparator for turning said siwthc on when an output from said first level detector is larger than an output from said second level detector and for turning said switch off when the output from said first level detector is smaller than the output from said second level detector; and
   (g) level lowering means for lowering the level of the output from said first level detector below the level of the output from said second level detector when the inputs to said first and second level detectors are substantially zero;
   (h) each of said first and second level detectors comprising an operational amplifier, said level lowering means comprising power supply means for applying voltages to power supply terminals of said operational amplifiers to determine the minimum output levels of said operational amplifiers, the power supply voltage applied to said first level detecter being smaller than the power supply voltage applied to said second level detector, and said first level detector having a gain smaller than the gain of said second level detector dependent on an amount of attenttuation by said narrow-band rejection filter.

2. An apparatus according to claim 1 wherein said control means comprises a first bandpass filter having an input terminal which is connected to said input terminal of said narrow-band rejection filter, said first bandpass filter having a center frequency that can be passed thereby which is substantially equal to said rejection center frequency of said narrow-band rejection filter, a second bandpass filter having an input terminal which is connected to said output terminal of said narrow-band rejection filter, said second bandpass filter having filter characteristics which are substantially equal to those of said first bandpass filter, and a phase comparator connected to output terminals of said first and second bandpass filters for detecting a phase difference between the outputs from said first and second bandpass filters and for producing an output of said control means, the inputs of said first and second level detectors being connected respectively to the output terminals of said first and second band-pass filters.

3. An apparatus according to claim 1, wherein said first and second level detectors include a pair of gain suppressing circuits respectively for lowering the gains of said first and second level detectors when the inputs thereto are larger than a predetermined value.

4. An apparatus according to claim 1, wherein said first and second level detectors include a pair of input resistors and a pair of feedback resistors connected to said operational amplifiers, respectively, a pair of rectifier diodes connected to outputs of said operational amplifiers, and a pair of smoothing circuits connected to said rectifier diodes for smoothing rectified outputs from said rectifier diodes.

5. An apparatus according to claim 4, wherein each of said first and second gain suppressing circuits comprises a resistor and a diode connected in series, said first and second gain suppressing circuits being connected parallel to said feedback resistors in said first and second level detectors, the arrangement being such that the diodes in said first and second gain suppressing circuits will be rendered conductive when the inputs to said first and second level detectors exceed a predetermined value.

6. An apparatus according to any one of claims 2, 3, 4 or 5, wherein said narrow-band rejection filter comprises a pair of first and second variable capacitance diodes connected in series with each other in opposite polarities, a resistor connected in parallel to said series-connected variable capacitance diodes and having ends serving as said input and output terminals of said narrow-band rejection filter, a series-connected circuit composed of an inductive element, a variable resistor, and a DC blocking capacitor and through which a junction between said first and second variable capacitance diodes is grounded, said DC blocking capacitor having an impedance small enough to have no substantial effect on the rejection frequency in a variable-frequency range of said narrow-band rejection filter and also have impedance-frequency characteristics variable in substantially inverse proportion to effective-resistance-frequency characteristics of said inductive element.

7. An apparatus according to claim 2 wherein said phase comparator comprises first and second waveform shapers for shaping the outputs from said first and second bandpass filters, respectively, into square-wave outputs, and AND gate for ANDing outputs from said first and second waveform shapers, a pair of flip-flops having trigger terminals for receiving the outputs from said first and second waveform shapers, respectively, and clear terminals for receiving an output from said AND gate, said flip-flops being in one of the logic levels at least under an initial condition, first and second series-connected circuits each composed of a resistor and a diode connected in series with one another, said first and second series connected circuits having one ends connected to opposite logic output terminals of said first and second flip-flops and the other ends thereof connected to each other at a junction, said diodes having opposite polarities with respect to said junction, and a capacitor connected between said junction and ground for supplying a voltage charged there across as the output of said phase comparator.

8. An apparatus according to claim 7, wherein said first and second flip-flops have input and output terminals interconnected in a crossed wiring formation.

9. An apparatus according to any one of claims 3, 4 or 5, wherein said control means includes phase comparing means for detecting a phase difference between the input and output of said narrow-band rejection filter and for producing an output of said control means, said phase comparing means comprising first and second waveform shapers for shaping signals derived from the input and output of said narrow-band rejection filter, respectively, into square-wave outputs, and AND gate for ANDing outputs from said first and second waveform shapers, first and second flip-flops having trigger terminals for receiving the outputs from said first and second waveform shapers, respectively, and clear terminals for receiving an output from said AND gate, said flip-flops being in one of the logic levels at least under an initial condition, first and second series-connected circuits each comprising a resistor and a diode connected in series, said first and second series-connected circuits having one ends connected to opposite logic output terminals of said first and second flip-flops and the other ends thereof connected to each other at a junction, said diodes having opposite polarities with respect to said junction, and a capacitor connected between said junction and ground for supplying a voltage charged thereacross as the output of said phase comparator.

10. An apparatus according to claim 9, wherein said first and second flip-flops have input and output terminals interconnected in a crossed wiring formation.

11. An apparatus for rejecting a jamming wave, comprising:
(a) a narrow-band rejection filter inserted in series in a reception signal path and having a rejection frequency variable by a control signal;
(b) first and second bandpass filters connected to input and output terminals, respectively, of said narrow-band rejection filter, each of said bandpass filters having a center frequency that can be passed thereby which is substantially equal to the rejection frequency of said narrow-band rejection filter, said first and second bandpass filters having substantially the same filter characteristics;
(c) first and second waveform shapers connected respectively to output terminals of said first and second bandpass filters for shaping the outputs from said first and second bandpass filters, respectively, into square-wave outputs;
(d) an AND gate connected to the output terminals of said first and second waveform shapers for ANDing outputs from said first and second waveform shapers;
(e) first and second flip-flops having trigger terminals for receiving the outputs from said first and second waveform shapers, respectively, and clear terminals for receiving an output from said AND gate, said flip-flops being in one of the logic levels at least under an initial condition;
(f) first and second series-connected circuits each of which comprises a resistor and a diode connected in series with one another, said first and second series-connected circuits having one ends connected to opposite logic output terminals of said first and second flip-flops respectively and the other ends connected to each other at a junction, said diodes having opposite polarities with respect to said junction; and
(g) a capacitor connected between said junction and ground for supplying a voltage charged thereacross as the control signal for said narrow-band rejection filter.

12. An apparatus according to claim 11, wherein said first and second flip-flops have input and output terminals interconnected in a crossed wiring formation.

13. An apparatus according to claim 11 or 12 wherein said narrow-band rejection filter comprises a pair of first and second variable capacitance diodes connected in series with each other in opposite polarities, a resistor connected in parallel to said series-connected variable capacitance diodes, the opposite ends of said resistor being connected respectively to said input and output terminals of said narrow-band rejection filter, a series-connected circuit comprising an inductive element, a variable resistor, and a DC blocking capacitor and through which a junction between said first and second variable capacitance diodes is grounded, said DC blocking capacitor having an impedance small enough to have no substantial effect on the rejection frequency in a variable-frequency range of said narrow-band rejection filter and also having impedance-frequency characteristics variable in substantially inverse proportion to effective-resistance-frequency characteristics of said inductive element.

14. An apparatus for rejecting a jamming wave, comprising:
(a) narrow-band rejection filter inserted in series in a reception signal path and including first and second variable capacitance diodes connected in series with each other, a resistor connected in parallel to said series-connected variable capacitance diodes and having ends serving as input and output terminals of said narrow-band rejection filter, a series-connected circuit composed of an inductive element, a variable resistor, and a DC blocking capacitor and through which a junction between said first and second variable capacitance diodes is grounded, said DC blocking capacitor having an impedance small enough to have no substantial effect on the rejection frequency in a variable-fre range of said narrow-band rejection filter and also having impedance-frequency characteristics variable in substantially inverse proportion to effective-resistance-frequency characteristics of said inductive element, said narrow-band rejection filter having a rejection frequency which is variable by changing a control signal applied to said first and second variable capacitance diodes;
(b) first and second bandpass filters connected to the input and output terminals, respectively, of said narrow-band rejection filter and each having a center frequency that can be passed thereby which is substantially equal to the rejection frequency of said narrow-band rejection filter, said first and second bandpass filters having substantially the same filter characteristics; and
(c) a phase comparator connected to output terminals of said first and second bandpass filters for detecting a phase difference between input signals applied thereto and supplying a signal indicative of the detected phase difference as the control signal to said narrow-band rejection filter.

* * * * *